(12) United States Patent
Poynter

(10) Patent No.: US 12,051,141 B2
(45) Date of Patent: Jul. 30, 2024

(54) LIVE VENUE PERFORMANCE SENSOR CAPTURE AND VISUALIZATION OVER GAME NETWORK

(71) Applicant: Sphere Entertainment Group, LLC, New York, NY (US)

(72) Inventor: Benjamin Poynter, New York, NY (US)

(73) Assignee: MSG Entertainment Group, LLC, New York, NY (US)

( * ) Notice: Subject to any disclaimer, the term of this patent is extended or adjusted under 35 U.S.C. 154(b) by 338 days.

(21) Appl. No.: 17/461,466

(22) Filed: Aug. 30, 2021

(65) Prior Publication Data

US 2023/0062315 A1 Mar. 2, 2023

(51) Int. Cl.
| | |
|---|---|
| G06T 13/80 | (2011.01) |
| A63F 13/285 | (2014.01) |
| A63F 13/35 | (2014.01) |
| G06F 3/01 | (2006.01) |
| G06T 13/40 | (2011.01) |
| H04W 4/021 | (2018.01) |

(52) U.S. Cl.
CPC ........... *G06T 13/80* (2013.01); *A63F 13/285* (2014.09); *A63F 13/35* (2014.09); *G06F 3/011* (2013.01); *G06F 3/016* (2013.01); *G06T 13/40* (2013.01); *H04W 4/021* (2013.01)

(58) Field of Classification Search
CPC ....... G06T 13/80; G06T 13/40; A63F 13/285; A63F 13/35; A63F 13/428; A63F 13/55; A63F 13/212; G06F 3/011; G06F 3/016; H04W 4/021; H04W 4/38
See application file for complete search history.

(56) References Cited

U.S. PATENT DOCUMENTS

| | | | |
|---|---|---|---|
| 11,514,653 B1 | 11/2022 | Cordes et al. | |
| 2005/0113167 A1* | 5/2005 | Buchner | A63F 13/217 463/30 |
| 2013/0163960 A1* | 6/2013 | Abecassis | H04N 9/8227 386/244 |
| 2015/0350628 A1* | 12/2015 | Sanders | G06F 3/011 345/419 |

(Continued)

FOREIGN PATENT DOCUMENTS

CN 113822970 A 12/2021

OTHER PUBLICATIONS

International Search Report and Written Opinion directed to related International Application No. PCT/US2023/075422, mailed Apr. 16, 2024; 11 pages.

(Continued)

*Primary Examiner* — Jitesh Patel
(74) *Attorney, Agent, or Firm* — Sterne, Kessler, Goldstein & Fox P.L.L.C.

(57) ABSTRACT

A system and methods for providing interactive content to an audience is disclosed. In aspects, system implements methods to receive sensor data captured by one or more sensors affixed to a performer. A graphical visualization is rendered based on the sensor data. The graphical visualization is transmitted to one or more external devices associated with one or more members of the audience for incorporation into a application executing on the one or more external devices.

20 Claims, 5 Drawing Sheets

(56) References Cited

U.S. PATENT DOCUMENTS

2021/0166479 A1* 6/2021 Fukumoto ........... G06F 3/04815

OTHER PUBLICATIONS

Anthousis Andreadis et al: "Real-Time Motion Capture Technology on a Live Theatrical Performance with Computer Generated Scenery", Informatics (PCI) I 2010 14th Panhellenic Conference on, IEEE, Piscataway, NJ, USA, Sep. 10, 2010 (Sep. 10, 2010), pp. 148-152, XP031774425.
Fulton Stephanie Fultonsn@Whitman Edu et al: "Stage Together: Remote Rehearsal of Theater Blocking", proceedings of the 15th international conference on pervasive technologies related to assistive environments, acmpub27, New York, NY, USA, Jun. 22, 2022 (Jun. 22, 2022), pp. 1-5, XP058817634.

* cited by examiner

LIVE VENUE PERFORMANCE SENSOR CAPTURE AND VISUALIZATION OVER GAME NETWORK

BACKGROUND

Live performances such as concerts or theatre are typically one-way interactions in which one or more performers present for an audience. In a traditional audience-performer relationship, the interaction between performer and the audience flows only from the performer to the audience. Even if interactions occur from the audience to the performer, these are typically minimal interactions on the part of the audience. They can include an audience chanting in response to a request by the performer, an audience singing lyrics with a song performed, an audience holding lighters or glow sticks to illuminate a venue, an audience clapping in response to a performance, filling out a questionnaire following the show, etc. For the audience that chooses to witness a live performance, they consume more but never so often participate, which leaves the value of attending a live performance with more to be desired.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

DETAILED DESCRIPTION

Figure 1:
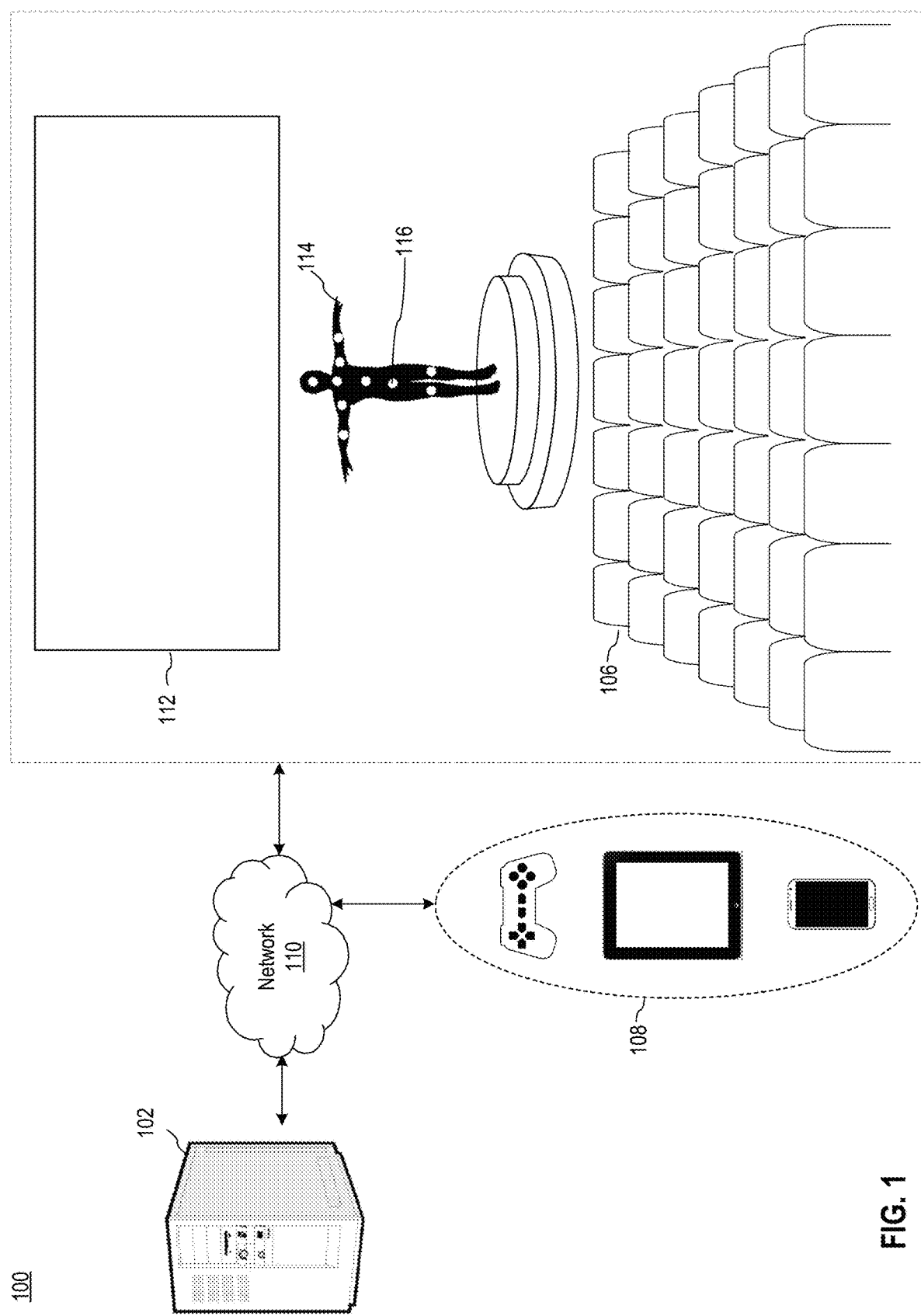
FIG. 1 is a venue for providing interactive content to one or more members of an audience, in exemplary aspects of the present disclosure.

Aspects disclosed herein provide a system and a method for providing interactive content to an audience. The system and the method can merge the notions of a sensor assisted live performance with interactive gaming to provide one or more members of an audience and the performer with an immersive and highly interactive experience with one another. In aspects, this is done via an interactive application, such as a video game, which incorporates sensor data received from sensors affixed to the performer. In aspects, the received sensor data may be incorporated into the application via an engine capable of generating and/or displaying graphic visualizations. In aspects, the one or more audience members can interact with the graphic visualizations of the live performer as a result of affixed sensors to the live performer. The interaction can be via a device on which the application is installed. In aspects, the interactions can result in changes to a venue, such as changes to a large display within a venue, in which the performer is performing. In aspects, the interactions can also result in feedback being provided to the performer. In aspects, the interactions can also allow one or more of the audience members to control aspects related to the performance via the application. Thus, back and forth interactions may be generated between the performer, a venue in which the performance is taking place, and the one or more members of the audience.

In aspects, the system can perform the aforementioned functionality by implementing methods to receive sensor data captured by one or more sensors affixed to a performer. In aspects, the system can render a graphical visualization based on the sensor data via game engine logic. In aspects, the system can transmit the graphical visualization to one or more external devices associated with one or more members of the audience for incorporation into an application executing on the one or more external devices. In aspects, the sensor data captured can include a motion capture data, an acoustic data, or a biometric data. In aspects, the graphical visualization may be a rigged scene, and the rigged scene may be rendered to change based on the sensor data. In the case of rigged scene, it is in reference to a rigged character model displayed on the graphical visualization. In aspects, the graphical visualization may be a rigged character, and the rigged character may be rendered to mimic movements of the performer based on the sensor data. In aspects, the system can transmit the graphical visualization to the one or more external devices in real-time from when the sensor data is captured. In aspects, the system can receive one or more inputs from the one or more external devices via the application and cause an interaction with the performer or a venue in which the performer is acting based on the one or more inputs. In aspects, the interactions can include generating a graphic for display on a display interface in the venue. In aspects, the interactions can include generating a haptic feedback and transmitting the haptic feedback to the performer. In aspects, the interactions can include enabling the one or more members of the audience to control one or more mechanical elements in the venue via the application.

The following aspects are described in sufficient detail to enable those skilled in the art to make and use the disclosure. It is to be understood that other aspects are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some well-known circuits, system configurations, architectures, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The modules or units in the following description of the aspects may be coupled to one another as described or as shown. The coupling may be direct or indirect, without or with intervening items between coupled modules or units. The coupling may be by physical contact or by communication between modules or units.

System Overview and Function

FIG. 1 shows a venue 100 for providing interactive content to one or more members of an audience 106, in exemplary aspects of the present disclosure. In aspects, the interactive content can allow the one or more members of the audience 106 to participate in a performance, such as a live performance, via an application 210 (for example a video game as will be further described with respect to FIG. 2A). In aspects, and as illustrated in FIG. 1, the venue 100 can represent a location for hosting an event. For example, the venue 100 can represent a music venue, for example, a music theater, a music club, and/or a concert hall. In aspects, the venue 100 may be a sporting venue, for example, an arena, a convention center, and/or a stadium, or any other suitable location in which a performer 114 can conduct a performance. In aspects, the performer 114 may be, for example, a singer, an actor, a musician, a machine, a computer, or any other mechanical device or individual that can conduct the performance in front of the one or more members of the audience 106. In aspects, the event can represent a musical event, a theatrical performance, a sporting event, etc.

In aspects, a computing system of the venue 100 can enable presentation of the interactive content to the one or more members of the audience 106 within the venue 100. In aspects, the interactive content may be any audio, visual, or sensory content, such as sounds, music, graphics, lights, movies, still or moving images, smells, or a combination thereof, as examples. In aspects, the interactive content can also take the form of the application 210, such as an interactive game, and/or graphical elements or visualizations incorporated into the application 210. In aspects, the application 210 and/or graphical elements or visualizations may be provided to the one or more members of the audience 106 via one or more external devices 108 on which the application 210 is being executed on.

In aspects, the one or more external devices 108 may be, for example, a mobile device, a laptop computer, a desktop computer, a tablet computer, a portable video game console, a virtual reality (VR) headset, an augmented reality (AR) device (such as a licensed AR wearable pair of glasses'), or any similar device on which the application 210 and/or graphical elements or visualizations to be incorporated into the application 210 may be played or displayed.

In aspects, the computing system can include a host server machine 102 to facilitate the transmission of the interactive content to the one or more members of the audience 106. In aspects, the host server machine 102 may be part of a backend computing infrastructure of the venue 100. In aspects, the host server machine 102 may be implemented as any of a variety of centralized or decentralized computing devices. For example, the host server machine 102 may be a laptop computer or a desktop computer, or may be part of a decentralized computing device such as grid-computing resources, a virtualized computing resource, cloud computing resources, routers, switches, peer-to-peer distributed computing devices, or a combination thereof. The host server machine 102 may be centralized in a single room within the venue 100, distributed across different rooms, distributed across different geographic locations, or may be embedded within a network 110.

The network 110 may be any telecommunications network such as a wireless or wired network. The network 110 may span and represent a variety of telecommunication networks and telecommunication network topologies. For example, the network 110 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 110. Cable, Ethernet, digital subscriber line (DSL), fiber optic lines, fiber to the home (FTTH), and plain old telephone service (POTS) are examples of wired communication that may be included in the network 110. Further, the network 110 may traverse a number of network topologies and distances. For example, the network 110 may include direct connection, personal area network (PAN), local area network (LAN), metropolitan area network (MAN), wide area network (WAN), or a combination thereof.

In aspects, the network 110 can connect the computing systems or devices of the venue 100 to one or more devices, for example the host server machine 102 to the one or more external devices 108 via, for example, a LAN. Additionally, the network 110 can connect additional devices of the venue 100 to the host server machine 102 and/or the one or more external devices 108. For example, in aspects, the venue 100 can have a display interface 112, such as a video screen, a television, light emitting diode (LED) displays, etc. that may be part of an audio/visual system of the venue 100, and that may be connected to the host server machine 102 and/or the one or more external devices 108, via the network 110. In aspects, the network 110 can enable all three to interact with one another. In aspects, and as an example, the network 110 can enable the host server machine 102 to transmit the application 210 (e.g., an interactive video game) and/or graphical elements or visualizations to be incorporated into the application 210, to be transmitted to the one or more external devices 108.

In aspects, the performer 114 can have one or more sensors 116 affixed to the performer 114. In aspects, the one or more sensors 116 can obtain one or more pieces of data that can facilitate and/or affect the generation of the interactive content. For example, the generated interactive content can be graphical visualizations 208 of FIG. 2A, that can be displayed on the one or more external devices 108, or the display interface 112. For example, the one or more sensors 116 may be motion capture sensors, microphones, piezoelectric sensors, biometric sensors, VR tracking sensors, or other suitable sensors as recognized by a person of ordinary skill in the art. In aspects, the one or more sensors 116 can generate the one or more pieces of data to include one of a motion capture data, an acoustic data generated by an acoustic instrument, or a biometric data originating from the performer 114 and/or devices or instruments connected to the performer 114. In aspects, the one or more sensors 116 may be affixed to the performer 114. For example, the one or more sensors 116 may be affixed to a suit worn by the performer 114, the body of the performer 114, instruments being played by the performer 114, a microphone in which the performer 114 is singing, etc. In aspects, the one or more sensors 116 can obtain the one or more pieces of data based on the type of sensor and transmit that data to the host server machine 102 for further processing and incorporation into the application 210. For example, in aspects, the one or more pieces of data may be used to generate portions of the application 210 and/or graphical elements or visualizations to be incorporated into the application 210. How the aforementioned functions are executed will be discussed further below.

Figure 2A:
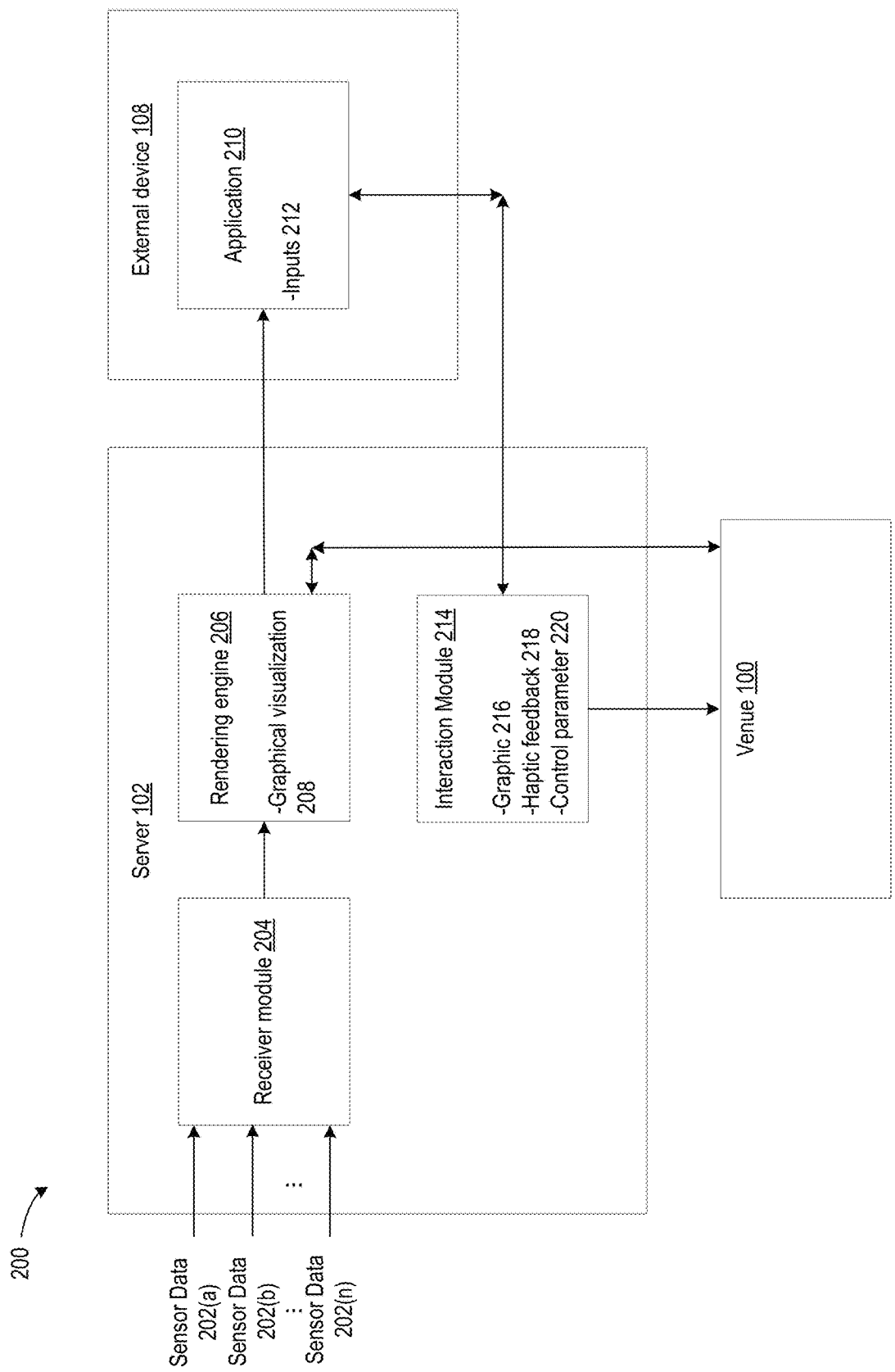
FIG. 2A is a control flow for providing the interactive content, in exemplary aspects of the present disclosure.

FIG. 2A shows a control flow 200 for providing the interactive content to the one or more members of the audience 106, in exemplary aspects of the present disclosure. In aspects, the control flow 200 can include one or more modules to facilitate providing the interactive content. In aspects, these can include a receiver module 204, a rendering engine 206, and an interaction module 214. While the aforementioned modules are shown as being implemented on the host server machine 102 in FIG. 2A, this is exemplary. In other aspects, some or all of the modules may be implemented on other devices such as the external device 108 or other devices of the venue 100 using a client-server architecture. For the purposes of discussion, and with respect to FIG. 2A however, it will be assumed that the modules are implemented on the host server machine 102. How these modules interact with other components of the venue 100, the performer 114, and the one or more external devices 108 to provide the interactive content to the one or more members of the audience 106 will be discussed below.

In aspects, the receiver module 204 can enable receipt of the one or more pieces of data received from the one or more sensors 116 (of FIG. 1). For purposes of discussion with respect to FIG. 2A, the one or more pieces of data will be referred to as sensor data 202. The sensor data 202 is shown in FIG. 2A as elements {202(a), 202(b), . . . 202(n)}. The sensor data 202 can represent different streams of the one or more pieces of data received from the one or more sensors 116. For example, in aspects, sensor data 202(a) can represent motion capture data received from motion sensors affixed to the performer 114 of FIG. 1. In aspects, sensor data 202(b) can represent acoustic data received from a microphone in which the performer 114 is singing. In aspects, sensor data 202(n) can represent biometric data, such as a heartbeat, moisture data measuring whether the performer 114 is sweating and how much, etc., received from biometric sensors affixed to the performer 114.

In aspects, the receiver module 204 can receive the sensor data 202 via an interface or software that can deliver the sensor data 202 to the receiver module 204. In aspects, the interface may be an application programming interface (API) which can transmit the sensor data 202 to the receiver module 204. In aspects, once the sensor data 202 is received, the receiver module 204 can further transmit the sensor data 202 to a rendering engine 206 for further processing.

In aspects, the rendering engine 206 may be a software and/or hardware component that enables the transformation of the sensor data 202 to a graphical visualization 208 to be incorporated into an application 210. For example, the rendering engine 206 can transform the sensor data 202 to provide a variety of interactive experiences; with an example being a mass-interactive application, which accepts the sensor data 202 and integrates aforementioned data into a video game played by the one or more members of the audience 106. In aspects, the video game can include one or more genres of games, such as an action game, an adventure game, a fighting game, a platform game, a puzzle game, a racing game, a role-playing game, a rhythm game, a shooter game, a simulation game, a sports game, a strategy game, and/or any other suitable genres of games that solicits direct and/or active participation of the one or more members of the audience 106. In aspects, the graphical visualization 208 may be, for example, a rigged scene within the application 210, a rigged character of the application 210, etc. The rigged scene or the rigged character may be a virtual scene or character from the rendering engine 206, which contains a fully virtual (2-dimensional or 3-dimensional) character or scene model, which accepts visual changes based on the sensor data 202. In aspects, the graphical visualization 208 may be or part of the interactive content provided to the one or more members of the audience 106 of FIG. 1.

In aspects, the rendering engine 206 may be part of a game engine or graphics rendering and/or generation engine, which can transform the sensor data 202 to the graphical visualization 208. In aspects, the game engine or graphics generating engine may be, for example, Unity™, Unreal™, Notch™, Touch Designer™, or any other suitable game or graphics rendering and/or generation engine that can transform the sensor data 202 to the graphical visualization 208.

In aspects, the rendering engine 206 can receive the sensor data 202 via an API. In aspects, once received, the rendering engine 206 can transform the sensor data 202 to the graphical visualization 208 via various pre-built libraries of the rendering engine 206. For example, in the example of the sensor data 202 being motion capture data, a person of ordinary skill in the art will recognize that the aforementioned examples of the rendering engine 206 (e.g., Unity™, Unreal™, etc.) can have pre-built libraries that can recognize the motion capture data received and transform the motion capture data to virtual poses. In aspects, the virtual poses can further be used to render a graphical visualization 208 based on the virtual poses to mimic movements captured by the one or more sensors. A person of ordinary skill in the art will also recognize that such libraries may be built programmatically within the rendering engine 206. For the purposes of discussion with respect to FIG. 2A, it is assumed that pre-built libraries will be used. In aspects, the pre-built libraries can be further customized to implement some of the functionality described in this disclosure. A person of ordinary skill in the art will recognize the functionality for which customization is required.

In aspects, the graphical visualization 208 may be a rigged character. In aspects, the rendering engine 206 can, for example, transform the motion capture data to virtual poses to allow the rigged character to mimic movements based on the motion capture data. For example, if the performer 114 moves his or her leg, the motion capture data can reflect this movement, and the rendering engine 206 can transform that motion capture data to have the rigged character also move its leg in the same or similar manner. In the aforementioned aspects, moving any joint would also be recognized and transmitted throughout the venue space.

In aspects, if the sensor data 202 is acoustic data generated by vibration readings during a live musical performance, the rendering engine 206 can analyze the frequencies of the sounds received, and based on the sounds received, render the graphical visualization 208 to reflect the frequencies. For example, if the performer 114 sings a high pitch note above a pre-determined frequency, a rigged character can change colors on the display interface 112 and/or on the one or more external devices 108.

In aspects, if the sensor data 202 is biometric data, the rendering engine 206 can determine if, for example, the performer 114 is sweating and at what rate, or whether the performer 114 has an elevated heartbeat above a pre-determined threshold, and based on the same, change the color of the rigged character on the display interface 112 and/or on the one or more external devices 108. The aforementioned are examples. Other renderings may be made according to the need of the application 210.

In aspects, if the graphical visualization 208 is a rigged scene, similar renderings as previously discussed with respect to the rigged character may be made, but with respect to the rigged scene. For example, sensor data 202 reflecting certain movements of the performer 114 can result in the rendering engine 206 rendering the rigged scene to change. For example, movements of the performer to the right or the left of a stage can result in a rigged scene changing, for example, from day to night, or from for example, a forest scene to an urban scene given the root positional data of a particular character within the scene. In aspects, other renderings can include changes of background colors of the rigged scene, changes in rigged characters appearing within the rigged scene, etc. The aforementioned are exemplary. The renderings can change and depend on the need of the application 210.

In aspects, once the rendering engine 206 generates and/or renders the graphical visualization 208, the rendering engine 206 can transmit the graphical visualization 208 to the one or more external devices 108 of FIG. 1, for incorporation into the application 210. In aspects, the application 210 may be executing on the one or more external devices 108. In aspects, the one or more external devices 108 may be associated with the one or more members of the audience 106 and display and/or execute the application 210 for the one or more members of the audience 106. In aspects, the transmission may be via an API. In aspects, the API can interface between the rendering engine 206 and the application 210. In aspects, and as previously indicated, the graphical visualization 208 may be transmitted via the API to be incorporated into the application 210.

In aspects, the rendering engine 206 can also directly transmit the graphical visualization 208 to the display interface 112 in conjunction with transmitting to the one or more external devices 108. In this way, the graphical visualization 208 can be shared and displayed across multiple devices and/or projected on different displays.

In aspects, once the graphical visualization 208 is incorporated into the application 210, the one or more members of the audience 106, can interact with the application 210 on each of their respective one or more external devices 108. In aspects, and based on the genre of the application 210, the graphical visualization 208 may be mirrored to each of the one or more external devices 108 for display. For example, if the graphical visualization 208 shows a rigged character running based on the movements of the performer 114, the running may be mirrored to each of the one or more external devices 108 for display. In aspects, based on the display of the graphical visualization 208, each of the one or more members of the audience 106 can provide one or more inputs 212 from their respective one or more external devices 108 into the application 210. In aspects, the one or more inputs 212 can allow the one or more members of the audience 106 to interact with the application 210. In aspects, the one or more inputs 212 can include swipes, inputs via buttons, screen manipulations, taps, voice inputs, textual inputs, etc., used to interact with the application 210. In aspects, the one or more inputs 212 may be used to help the one or more members of the audience 106 individually or collectively achieve a goal in the application 210. For example, the goal may be to assist a rigged character survive a phase of the application 210, achieve a score, perform a task, or appropriate logic commonly associated with an interactive work.

In aspects, the application 210 can collect, store, and/or accumulate the one or more inputs 212 as part of the logic of the application 210. In aspects, once received, the application 210 can further process the one or more inputs 212 to generate a parameter or variable that may be used to cause an interaction with the performer 114 and/or the venue 100 of FIG. 1. By way of example, in an exemplary embodiment, if the one or more inputs 212 are an accumulation of taps that result in certain characters in the application 210 being removed from potential to attack to help a motion capture controlled rigged character mimicking the movements of the performer 114 get past a level of the application 210, the logic of the application 210 can determine based on the accumulation of taps that the goal has been achieved and generate a variable or parameter indicating that the goal has been achieved. In aspects, the variable or parameter may be, for example, a character or numerical value, such as a letter "Y," or a string such as "COMPLETE" indicating the goal has been achieved, or a binary value, or integer, for example "1" indicating the goal has been achieved. In aspects, the application 210 can transmit the variable or parameter back to the host server machine 102 which can process the variable or parameter using the interaction module 214 to cause the interaction with the performer 114 and/or the venue 100.

In aspects, the interaction module 214 can enable causing the interaction with the performer 114 and/or the venue 100. In aspects, the interaction may be customized and take on a variety of forms based on the context of the application 210, the nature of the performance, the desired effect of the interaction, etc. A designer of the computing system can determine the customization for the interaction. For example, in aspects, the interaction can include generating a graphic 216 for display on the display interface 112 of FIG. 1 of the venue 100. In aspects, the interaction can include generating a haptic feedback 218 to be transmitted to the performer 114. In aspects, the interaction can include generating a control parameter 220 that can enable the one or more members of the audience 106 to control one or more mechanical elements in the venue 100 via the application 210.

For example, in aspects where the interaction can include generating the graphic 216, based on the one or more members of the audience 106 achieving a goal while interacting with the application 210, the application 210 can transmit the variable or parameter indicating the goal has been achieved. Based on the same, the interaction module 214 can process the variable or parameter to generate the graphic 216. In aspects, the graphic 216 may be displayed on the display interface 112. In aspects, the graphic 216 can indicate that the goal was achieved, can indicate the name of the one or more members of the audience 106 that achieved a highest score to achieve the goal, can show a rigged character to show up, can trigger a special visualization to appear on respective displays, and more contextualized logic befitting the interactive application 210, etc. The aforementioned are exemplary and any graphic 216 or visual created by the rendering engine 206 may be generated based on the need of the application 210 and/or the experience desired for the performance.

In aspects, where the interaction includes generating a haptic feedback 218 to be transmitted to the performer 114, the application 210 can transmit the variable or parameter indicating the goal has been achieved and based on the same, the interaction module 214 can process the variable or parameter to generate the haptic feedback 218. In aspects, the haptic feedback 218 can include a vibration or a series of vibrations that may be transmitted to the performer 114, either to a suit worn by the performer, directly to the body of the performer 114, or to an instrument being played by the performer 114. In aspects, the haptic feedback 218 can indicate to the performer 114 that the goal during mass-interaction with an application 210 was achieved and allow the performer 114 to take further actions such as sing a certain song based on receiving the haptic feedback 218, executing input to the rhythm of a color change or advancing to the next phase of a performance based interactive experience.

In aspects, where the interaction includes generating a control parameter 220 that can enable the one or more members of the audience 106 to control one or more mechanical elements in the venue 100 via the application 210, the application 210 can transmit the variable or parameter indicating a goal shared by the one or more members of the audience 106 within a venue 100 has been achieved, and the interaction module 214 can process the variable or parameter to generate the control parameter 220. In aspects, the control parameter 220 can take the form of a signal that can activate one or more mechanical elements in the venue 100. In aspects, the mechanical elements can include robots, lights, smoke machines, or other mechanical apparatuses that may be used as part of a musical or theatrical performance. In aspects, the control parameter 220 can enable activation of robots, lights, smoke machines, etc. In aspects, the control parameter 220 can provide a link to the one or more members of the audience 106 and allow the one or more members of the audience 106 or a subset thereof to directly control the one or more mechanical elements in the venue 100 via the application 210. In an exemplary embodiment, the control parameter 220 can do so by, for example receiving a variable or parameter from the application 210 indicating which of the one or more members of the audience 106 contributed most to achieving the shared goal, and based on the same provide a link to the one or more members of the audience 106 identified to allow only those members of the audience 106 to control the mechanical elements.

In aspects, in accordance to the nature of the performance, it is desirable to perform the aforementioned functions with respect to FIG. 2A in real-time. For example, in aspects, when the live performance is in real-time, the transmission of the graphical visualization 208 to the one or more external devices 108 may be done within milliseconds or seconds from when the sensor data 202 is captured. Thus, the rendering of the graphical visualization 208 should be achieved within milliseconds or seconds from when the sensor data 202 is received so that it may be quickly redirected to the one or more external devices 108 in order for the one or more members of the audience 106 to be able to provide the one or more inputs 212. This can allow for an interactive and immersive experience in which the one or more members of the audience 106 can interact with the performer 114 within milliseconds or seconds during the live performance.

It has been discovered that the system and methods described above significantly improves the state of the art from conventional systems. This is because the system and methods provide a novel way to integrate a performance with interactive gaming to provide one or more members of the audience 106, the performer 114, and a venue 100, an immersive and interactive experience with one another. This is achieved by integrating data obtained from the performance (e.g., the sensor data 202) and using the obtained data to generate one or more aspects of a application 210 by for example generating a graphical visualization 208 to obtain feedback from players of the game (e.g., the one or more members of the audience 106) to cause an interaction between the one or more members of the audience 106, the venue 100, and the performer 114.

It has been further discovered that implementing the aforementioned system to function in real-time, by for example, transmitting the graphical visualization 208 to the one or more external devices 108 within milliseconds or seconds from when the sensor data 202 is captured improves the state of the art because it provides for a system in which one or more members of the audience 106 can be presented with real-time interaction via application 210, such as a gaming based application on which they can act. This ability increases engagement by the one or more members of the audience 106 with the performer 114 because it allows for a novel way for individuals to interact with a performer 114 rather than passively receiving a performance.

The modules described with respect to FIG. 2A may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the computing system of the venue 100 (e.g., the host server machine 102) or installed as a removable portion of the computing system of the venue 100.

Figure 2B:
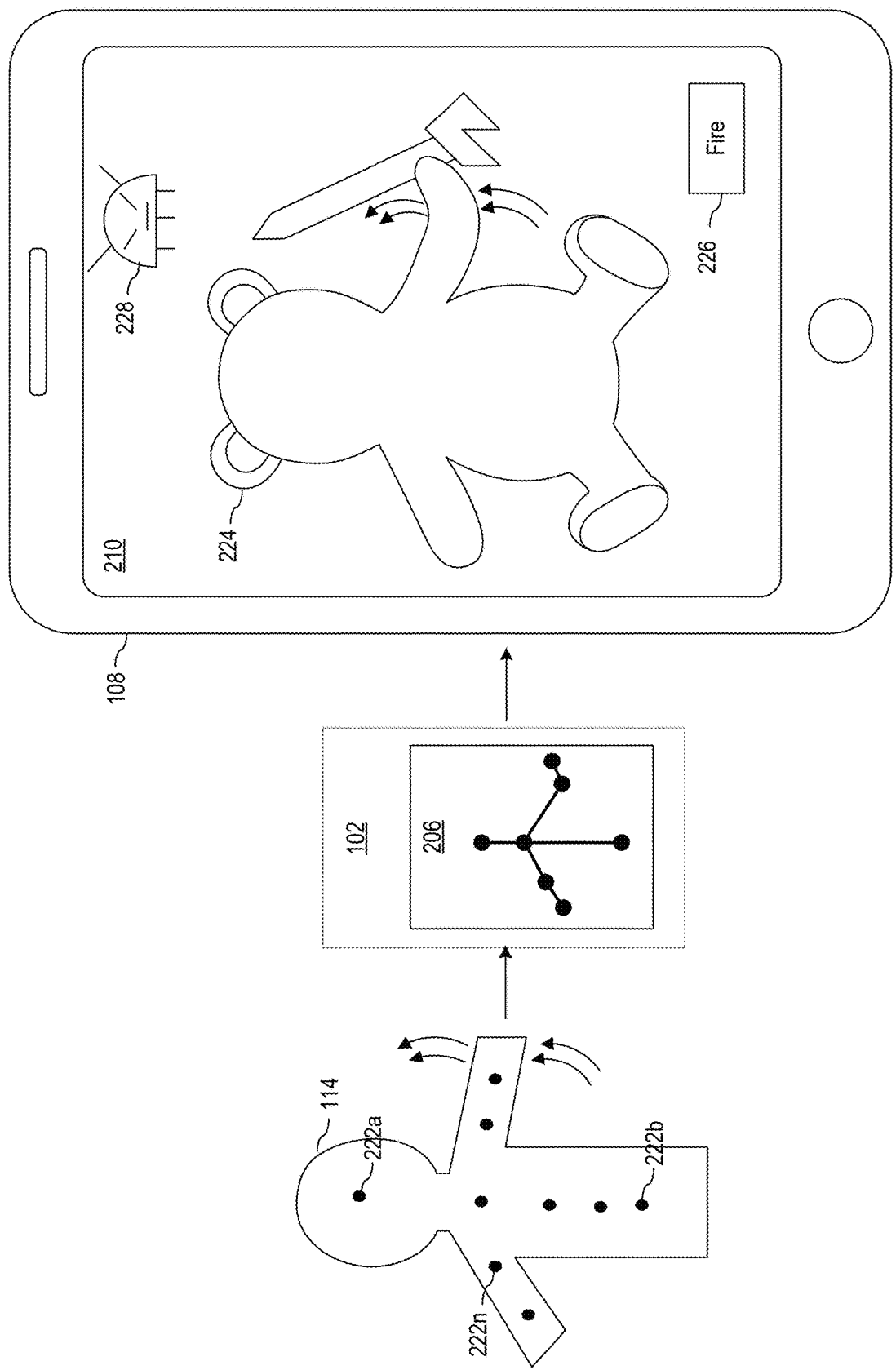
FIG. 2B shows an example of how motion capture data can be generated from sensors affixed to a performer and how graphical visualizations can be generated for an application based on the motion capture data, in exemplary aspects of the present disclosure.

FIG. 2B shows an example of how motion capture data can be generated from the one or more sensors affixed to a performer 114, and how graphical visualizations can be generated for an application 210 based on the motion capture data, in exemplary aspects of the present disclosure. While FIG. 2B shows how graphical visualizations can be generated based on one type of sensor data 202 (i.e., the motion capture data) similar principles apply to other types of data captured by sensors such as the biometric data and acoustic data. A person of ordinary skill in the art will recognize how the sensor data 202 can be transformed into graphical visualizations for these other types of data based on the disclosures herein.

Continuing with the example, FIG. 2B shows the performer 114 with the one or more sensors 222 affixed to his or her body. The one or more sensors 222 of FIG. 2B can be the same as those shown with respect to FIG. 1 (i.e., one or more sensors 116). In FIG. 2B each of the one or more sensors 222 is labeled as {222a, 222b, . . . , 222n}. In aspects, the one or more sensors 222 can be motion capture sensors, such as inertial sensors, which can capture the skeletal movements of the performer 114. For example, and as shown in FIG. 2B, the one or more sensors 222 can capture skeletal movements such as arm movements, joint movements, head movements, leg movements, and other similar bodily movements. As shown in FIG. 2B, the performer 114 is shown moving his or her arm. This arm movement can be captured by the one or more sensors 222. In aspects, once the movements are captured, motion capture data can be generated representing the movements. For example, coordinate data representing the performer's 114 arm position in a 2D or 3D plane can be generated representing the movements. In aspects, the data generated (e.g., coordinate data) can be transmitted by the one or more sensors 222 and/or electronics coupled to the one or more sensors 222, to the host server machine 102. The electronics can be, for example, communication circuits with antennas that can transmit the data generated.

Once received, the host server machine 102 can process the motion capture data utilizing the rendering engine 206. Based on the principles described with respect to FIG. 2A, the rendering engine 102 can utilize pre-built and/or customized libraries to transform the motion capture data into the graphical visualizations for display in an application 210 executing on one or more external devices 108, and/or to the display interface 112 in the venue 110. As shown in FIG. 2B, the graphical visualizations are displayed on an application 210. The application 210 of FIG. 2B is shown to be a video game. In aspects, and as shown in FIG. 2B, the graphical visualizations can be a rigged character 224. Based on the motion capture data, the rigged character 224 can mimic movements of the performer 114. For example, if the performer 114 moves his or her arm up or down the rigged character 224 can also mimic the movements in a mirrored fashion and move its arm up and down in the same manner.

As shown in FIG. 2B, the application 210 is executing one or more external devices 108. As a result, the one or more members of the audience 106 can also interact with the application 210 via the one or more external devices 108. For example, and as exemplified in FIG. 2B, if the application 210 is a video game, one or more members of the audience 106 can interact with the application 210 via one or more inputs 212. For example, and as shown in FIG. 2B, the one or more inputs 212 can be provided using a button/icon 226 indicating an action to be taken if the one or more members of the audience 106 presses the button/icon 226. For example, in FIG. 2B the button/icon 226 shown can trigger the rigged character 224 can fire a weapon at an enemy 228 as a part of the video game. In this way, the performer 114 can help guide, target, or position the rigged character 224 and the one or more members of the audience 106 can provide the triggering mechanism to utilize a weapon in the video game. In this way, the performer 114 and the one or more members of the audience 106 can interact with one another via the application 210 to achieve a common goal.

Methods of Operation

Figure 3:
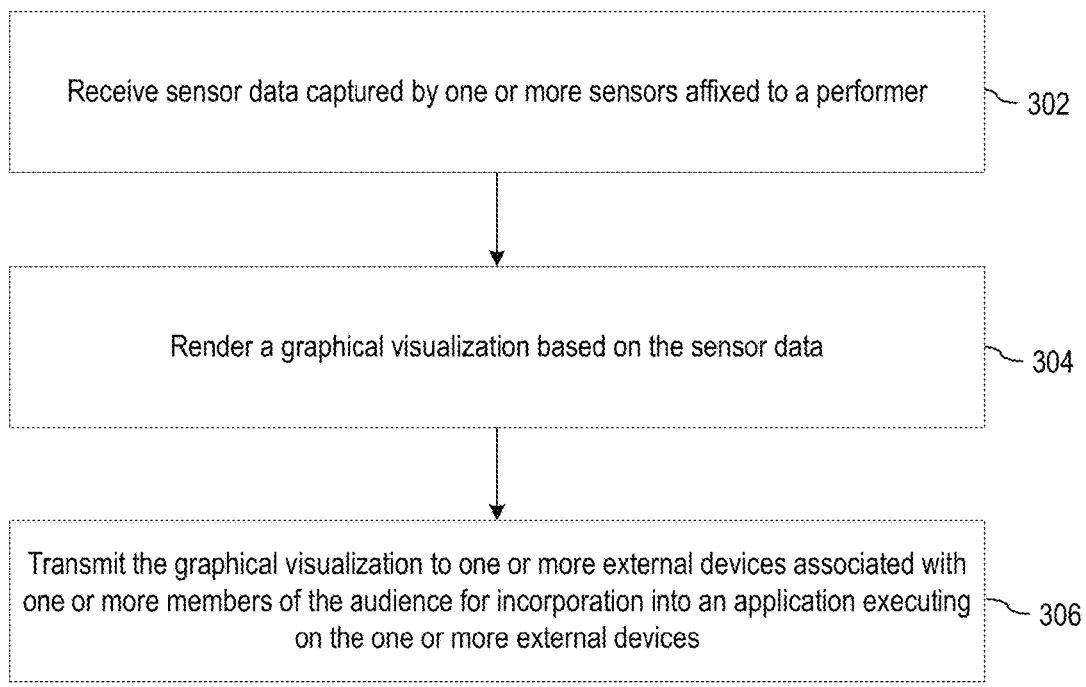
FIG. 3 is an example method for providing interactive content for incorporation into an application executing on one or more external devices, in exemplary aspects of the present disclosure.

FIG. 3 shows an example method 300 for providing interactive content for incorporation into an application 210 executing on one or more external devices 108. In aspects, method 300 may be performed by utilizing one or more computing devices, modules, or units, of the venue 100 or of the one or more external devices 108. In aspects, and as shown in step 302, method 300 can have one or more computing devices receive sensor data 202 captured by one or more sensors affixed to a performer 114. In aspects, and as shown in step 304, the one or more computing devices can render a graphical visualization 208 based on the sensor data 202. In aspects, and as shown in step 306, the one or more computing devices can transmit the graphical visualization 208 to one or more external devices 108 associated with one or more members of the audience 106 for incorporation into an application 210 executing on the one or more external devices 108.

In aspects, the sensor data 202 can include a motion capture data, an acoustic data, or a biometric data, or data collected from an array of hardware, which may monitor information as it relates to a performer 114.

In aspects, the graphical visualization 208 can be a rigged scene generated by the rendering engine 206, which can be rendered to change based on the sensor data 202.

In aspects, the graphical visualization 208 can be a rigged character which can be rendered to mirror movements of the performer 114 based on the sensor data 202.

In aspects, the one or more computing devices can transmit the graphical visualization 208 to the one or more external devices 108 can be done in real-time from when the sensor data 202 is captured.

In aspects, the one or more computing devices can receive one or more inputs 212 from the one or more external devices 108 via the application 210. In aspects, the one or more computing devices can cause an interaction with the performer 114 or a venue 100 in which the performer 114 is performing based on the one or more inputs 212. In aspects, the interaction can be in real-time.

In aspects, the one or more computing devices can cause the interaction by generating a graphic 216 for display on a display interface 112 in the venue 100.

In aspects, the one or more computing devices can cause the interaction by generating a haptic feedback 218 to be transmitted to the performer 114.

In aspects, the one or more computing devices can cause the interaction by enabling the one or more members of the audience 106 to control one or more mechanical elements in the venue 100 via the application 210. This can be done by, for example, generating a control parameter 220 to enable the control.

The operations of method 300 can be performed, for example, by the host server machine 102, in accordance with aspects described above.

Components of the Computing System that Provides the Interactive Content

Figure 4:
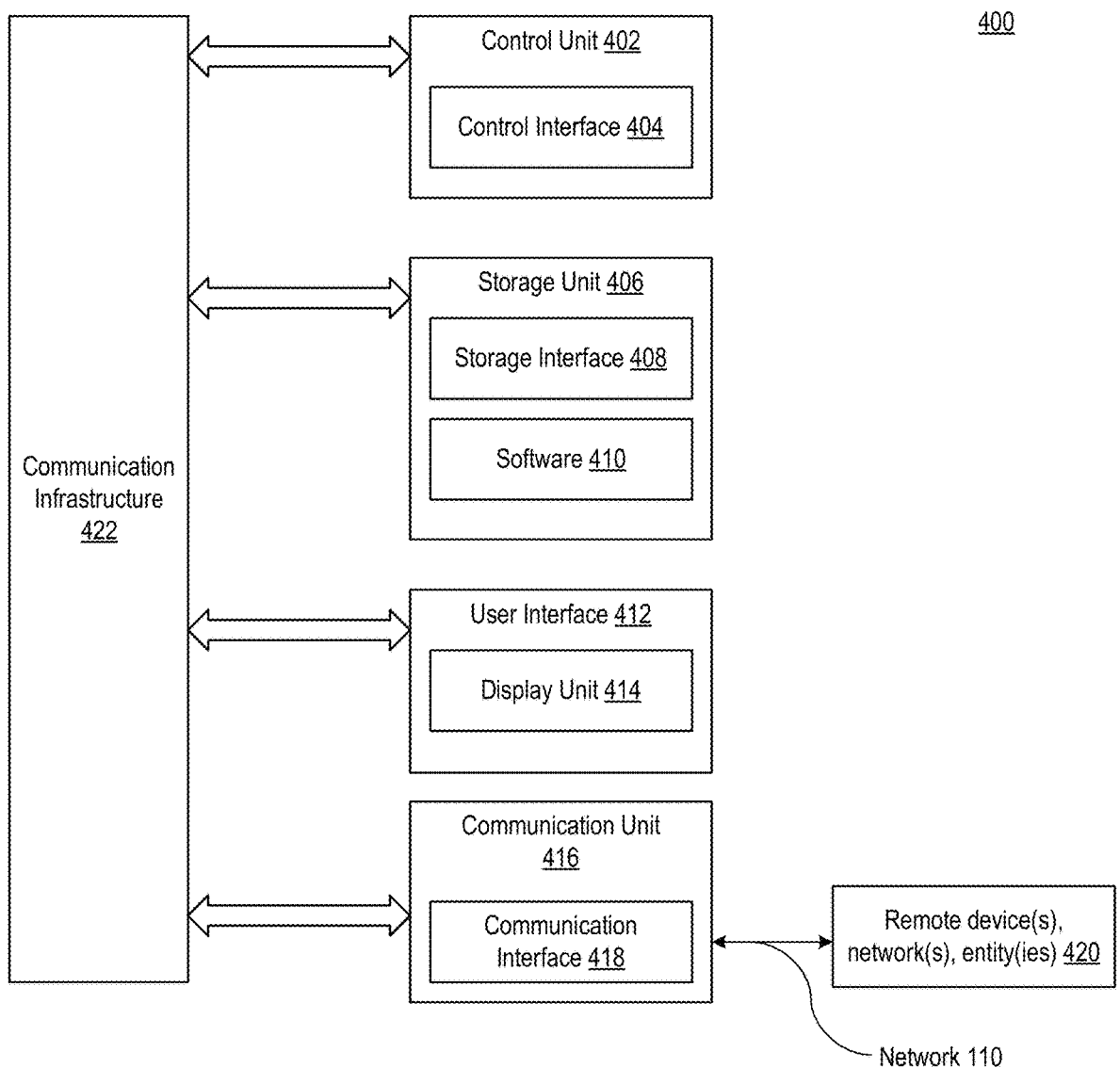
FIG. 4 is an example architecture of the components that may be used to implement a computing system which provides the interactive content, in exemplary aspects of the present disclosure.

FIG. 4 shows an example architecture 400 of the components that may be used to implement a computing system which provides the interactive content, in exemplary aspects of the present disclosure. In aspects, the components may be a part of any of the servers (e.g., host server machine 102) or computers of the venue 100. In aspects, the components can include a control unit 402, a storage unit 406, a communication unit 416, and a user interface 412. The control unit 402 may include a control interface 404. The control unit 402 may execute a software 410 to provide some or all of the intelligence of host server machine 102. The control unit 402 may be implemented in a number of different ways. For example, the control unit 402 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 404 may be used for communication between the control unit 402 and other functional units or devices of the computing system. The control interface 404 may also be used for communication that is external to the functional units or devices of the computing system. The control interface 404 may receive information from the functional units or devices of the computing system, or from remote devices 420, or may transmit information to the functional units or devices of the computing system, or to remote devices 420. The remote devices 420 refer to units or devices external to computing system, for example the one or more external devices 108.

The control interface 404 may be implemented in different ways and may include different implementations depending on which functional units or devices of the computing system or remote devices 420 are being interfaced with the control unit 402. For example, the control interface 404 may be implemented with optical circuitry, waveguides, wireless circuitry, wireline circuitry to attach to a bus, an application programming interface (API), or a combination thereof. The control interface 404 may be connected to a communication infrastructure 422, such as a bus, to interface with the functional units or devices of the computing system or remote devices 420.

The storage unit 406 may store the software 410. For illustrative purposes, the storage unit 406 is shown as a single element, although it is understood that the storage unit 406 may be a distribution of storage elements. Also for illustrative purposes, the storage unit 406 is shown as a single hierarchy storage system, although it is understood that the storage unit 406 may be in a different configuration. For example, the storage unit 406 may be formed with different storage technologies forming a memory hierarchical system including different levels of caching, main memory, rotating media, or off-line storage. The storage unit 406 may be a volatile memory, a nonvolatile memory, an internal memory, an external memory, or a combination thereof. For example, the storage unit 406 may be a nonvolatile storage such as nonvolatile random access memory (NVRAM), Flash memory, disk storage, or a volatile storage such as static random access memory (SRAM) or dynamic random access memory (DRAM).

The storage unit 406 may include a storage interface 408. The storage interface 408 may be used for communication between the storage unit 406 and other functional units or devices of the computing system. The storage interface 408 may also be used for communication that is external to computing system. The storage interface 408 may receive information from the other functional units or devices of the computing system or from remote devices 420, or may transmit information to the other functional units or devices of the computing system or to remote devices 420. The storage interface 408 may include different implementations depending on which functional units or devices of the computing system or remote devices 420 are being interfaced with the storage unit 406. The storage interface 408 may be implemented with technologies and techniques similar to the implementation of the control interface 404.

The communication unit 416 may allow communication to devices, components, modules, or units of the computing system or to remote devices 420. For example, the communication unit 416 may permit the computing system to communicate between its components such as the host server machine 102 and the display interface 112. The communication unit 416 may further permit the devices of the computing system to communicate with remote devices 420 such as an attachment, a peripheral device, the one or more external devices 108, or a combination thereof through the network 110.

The network 110 may span and represent a variety of networks and network topologies. For example, the network 110 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 110. Cable, Ethernet, digital subscriber line (DSL), fiber optic lines, fiber to the home (FTTH), and plain old telephone service (POTS) are examples of wired communication that may be included in the network 110. Further, the network 110 may traverse a number of network topologies and distances. For example, the network 110 may include direct connection, personal area network (PAN), local area network (LAN), metropolitan area network (MAN), wide area network (WAN), or a combination thereof.

The communication unit 416 may also function as a communication hub allowing computing system to function as part of the network 110 and not be limited to be an end point or terminal unit to the network 110. The communication unit 416 may include active and passive components, such as microelectronics or an antenna, for interaction with the network 110.

The communication unit 416 may include a communication interface 418. The communication interface 418 may be used for communication between the communication unit 416 and other functional units or devices of the computing system or to remote devices 420. The communication interface 418 may receive information from the other functional units or devices of the computing system, or from remote devices 420, or may transmit information to the other functional units or devices of the computing system or to remote devices 420. The communication interface 418 may include different implementations depending on which functional units or devices are being interfaced with the communication unit 416. The communication interface 418 may be implemented with technologies and techniques similar to the implementation of the control interface 404.

The user interface 412 may present information generated by the computing system. In aspects, the user interface 412 allows a user of the computing system to interface with the devices of the computing system or remote devices 420. The user interface 412 may include an input device and an output device. Examples of the input device of the user interface 412 may include a keypad, buttons, switches, touchpads, soft-keys, a keyboard, a mouse, or any combination thereof to provide data and communication inputs. Examples of the output device may include a display unit 414. The control unit 402 may operate the user interface 412 to present information generated by the computing system. The control unit 402 may also execute the software 410 to present information generated by the computing system, or to control other functional units of the computing system. The display unit 414 may be any graphical user interface such as a display, a projector, a video screen, or any combination thereof. The display unit 414 may be implemented with similar technologies as the display interface 112.

The above detailed description and aspects of the disclosed computing system are not intended to be exhaustive or to limit the disclosed computing system to the precise form disclosed above. While specific examples for the computing system are described above for illustrative purposes, various equivalent modifications are possible within the scope of the disclosed computing system, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method 300 and computing system are cost-effective, highly versatile, and may be implemented by adapting components for ready, efficient, and economical manufacturing, application, and utilization. Another important aspect of aspects of the present disclosure is that it valuably supports and services the historical trend of reducing costs, simplifying systems, and/or increasing performance.

These and other valuable aspects of the present disclosure consequently further the state of the technology to at least the next level. While the disclosed aspects have been described as the best mode of implementing computing system, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the scope of the invention should be determined not by the aspects illustrated, but by the appended claims and their equivalents.

What is claimed is:

1. A computer implemented method for providing interactive content to an audience, the method comprising:
   receiving, by one or more computing devices, sensor data captured by one or more sensors affixed to a performer in a venue;
   rendering, by the one or more computing devices and based on the sensor data, a graphical visualization for incorporation into a video game application executing on one or more external devices of one or more members of the audience of the venue;
   transmitting, by the one or more computing devices, the graphical visualization for display on the one or more external devices; and
   in response to transmitting the graphical visualization, receiving, by the one or more computing devices, an input from the one or more members of the audience via the video game application, wherein the input is collected to determine a collective goal of the one or more members of the audience in the video game application.

2. The method of claim 1, wherein the sensor data comprises motion capture data, an acoustic data, or a biometric data.

3. The method of claim 1, wherein the graphical visualization comprises a virtual scene with rigs, and wherein the rendering comprises rendering the virtual scene with rigs to change based on the sensor data.

4. The method of claim 1, wherein the graphical visualization comprises a virtual character with rigs, and wherein the rendering comprises rendering the virtual character with rigs to mimic movements of the performer based on the sensor data.

5. The method of claim 1, wherein transmitting the graphical visualization to the one or more external devices is done in real-time from when the sensor data is captured.

6. The method of claim 1, further comprising:
   receiving, by the one or more computing devices, a further input from the one or more external devices via the video game application; and
   causing, by the one or more computing devices, an interaction with the performer of the venue in which the performer is performing based on the further input.

7. The method of claim 6, wherein causing the interaction comprises generating a graphic for display on a display interface in the venue.

8. The method of claim 6, wherein causing the interaction comprises:
   generating a haptic feedback; and
   transmitting the haptic feedback to the performer.

9. The method of claim 6, wherein causing the interaction comprises enabling the one or more members of the audience to control one or more mechanical elements in the venue via the video game application.

10. A server for providing interactive content to an audience, the server comprising:
    a control unit configured to:
      receive sensor data captured by one or more sensors affixed to a performer in a venue,
      render based on the sensor data a graphical visualization for incorporation into a video game application executing on one or more external devices of one or more members of the audience of the venue; and
    a communication unit, coupled to the control unit, configured to:
      transmit the graphical visualization for display on the one or more external devices associated with the one or more members of the audience for incorporation into an application executing on the one or more external devices;
      in response to transmitting the graphical visualization, receiving an input from the one or more members of the audience via the video game application; and
      wherein the control unit is further configured to collect each input and determine, based on the collected input, a collective goal of the one or more members of the audience in the video game application.

11. The server of claim 10, wherein the sensor data captured comprises motion capture data, an acoustic data, or a biometric data.

12. The server of claim 10, wherein the graphical visualization comprises a virtual scene with rigs, and wherein the rendering comprises rendering the virtual scene with rigs to change based on the sensor data.

13. The server of claim 10, wherein the graphical visualization comprises a virtual character with rigs, and wherein the rendering comprises rendering the virtual character with rigs to mimic movements of the performer based on the sensor data.

14. The server of claim 10, wherein transmitting the graphical visualization to the one or more external devices is done in real-time from when the sensor data is captured.

15. The server of claim 10, wherein:
    the communication unit is further configured to receive a further input from the one or more external devices via the video game application; and
    the control unit is further configured to cause an interaction with the performer of the venue in which the performer is performing based on the further input.

16. The server of claim 15, wherein the control unit is further configured to cause the interaction by generating a graphic for display on a display interface in the venue.

17. The server of claim 15, wherein:
    the control unit is further configured to cause the interaction by generating a haptic feedback; and
    the communication unit is further configured to transmit the haptic feedback to the performer.

18. The server of claim 15, wherein the control unit is further configured to cause the interaction by enabling the one or more members of the audience to control one or more mechanical elements in the venue via the video game application.

19. A venue for providing interactive content to an audience, the venue comprising:
a server configured to:
receive sensor data captured by one or more sensors affixed to a performer of the venue, render, based on the sensor data, a graphical visualization for incorporation into a video game application executing on one or more external devices of one or more members of the audience of the venue,
transmit the graphical visualization for display on the one or more external devices associated with the one or more members of the audience for incorporation into an application executing on the one or more external devices; and
in response to transmitting the graphical visualization, receive an input from the one or more members of the audience via the video game application, wherein the input is collected to determine a collective goal of the one or more members of the audience in the video game application.

20. The venue of claim 19, wherein the server is further configured to transmit the graphical visualization to the one or more external devices in real-time from when the sensor data is captured.

* * * * *